(12) United States Patent
Kong et al.

(10) Patent No.: US 10,775,480 B2
(45) Date of Patent: Sep. 15, 2020

(54) OPTIMIZED DIFFERENTIAL EVOLUTION FOR RADIO FREQUENCY TRILATERATION IN COMPLEX ENVIRONMENTS

(71) Applicants: VOLKSWAGEN AG, Wolfsburg (DE); PORSCHE AG, Stuttgart (DE); AUDI AG, Ingolstadt (DE)

(72) Inventors: Liang Kong, Belmont, CA (US); Oleg Tolstov, San Carlos, CA (US); Andrea Kuklenyik, San Francisco, CA (US); Florian Rill, Redwood City, CA (US)

(73) Assignees: Volkswagen AG, Wolfsburg (DE); PORSCHE AG, Stuttgart (DE); AUDI AG, Ingolstadt (DE)

( * ) Notice: Subject to any disclaimer, the term of this patent is extended or adjusted under 35 U.S.C. 154(b) by 137 days.

(21) Appl. No.: 16/174,326

(22) Filed: Oct. 30, 2018

(65) Prior Publication Data

US 2020/0132807 A1 Apr. 30, 2020

(51) Int. Cl.
*G01S 7/295* (2006.01)
*B60R 25/20* (2013.01)
*B60R 25/24* (2013.01)
*G01S 13/76* (2006.01)

(52) U.S. Cl.
CPC .......... *G01S 7/295* (2013.01); *B60R 25/209* (2013.01); *B60R 25/24* (2013.01); *G01S 13/767* (2013.01)

(58) Field of Classification Search
CPC .......... G01S 7/295; G01S 13/767; G01S 5/02; B60R 25/24; B60R 25/209
USPC .................................................. 342/457, 122
See application file for complete search history.

(56) References Cited

U.S. PATENT DOCUMENTS

| 8,672,382 | B2* | 3/2014 | Schipke | B60R 21/0136 296/4 |
| 8,860,611 | B1* | 10/2014 | Anderson | G01S 5/02 342/457 |
| 2012/0007787 | A1* | 1/2012 | Schantz | H01Q 1/273 343/788 |
| 2017/0314892 | A1* | 11/2017 | Holder | G01S 13/003 |

OTHER PUBLICATIONS

Masegosa et al.; A new optimization approach for indoor location based on Differential Evolution; 16th World Congress of the International Fuzzy Systems Association (IFSA); 9th Conference of the European Society for Fuzzy Logic and Technology (EUSFLAT); 2015; pp. 1604-1611; Atlantis Press.

* cited by examiner

*Primary Examiner* — Bo Fan
(74) *Attorney, Agent, or Firm* — Barnes & Thornburg LLP

(57) ABSTRACT

A system, device and method for wireless device localization using a differential evolution algorithm in a continuous trilateration process.

14 Claims, 6 Drawing Sheets

---

102 — DETERMINE DISTANCE USING TIME OF FLIGHT METHOD

104 — BASED ON THE TIME OF FLIGHT DISTANCES DETERMINE ZONE WHERE WIRELESS DEVICE MAY BE LOCATED USING TRILATERATION

106 — LOCALIZE WIRELESS DEVICE USING DIFFERENTIAL EVOLUTION

OPTIMIZED DIFFERENTIAL EVOLUTION FOR RADIO FREQUENCY TRILATERATION IN COMPLEX ENVIRONMENTS

BACKGROUND

Wireless devices may be used to lock and unlock vehicles, remotely start ignitions, or activate other electronic functions. Typically, the wireless device must be within a certain distance from the vehicle before it can trigger these electronic functions. Therefore, an important aspect of an algorithm used in wireless device systems, such as keyless entry systems, is the method of locating the position of the wireless device with respect to the vehicle in three-dimensional space. This requires a determination of distances based on measurements obtained by a plurality of sensors.

The signal connection between a wireless device and a vehicle with a conventional keyless entry system can be easily extended using readily available universal transmitters. This factor can be employed for nefarious activities, such as automobile theft. A driver can lock a vehicle and walk beyond the wireless key activation zone, however, a thief having a transmitter can extend that zone to unlock the vehicle while the vehicle key is too far from the vehicle to directly activate the keyless entry system.

Accordingly there is a need for a system, device and method to prevent or hinder unauthorized extension of the signal transmission of wireless devices.

SUMMARY

Disclosed embodiments provide systems, devices and methods for wireless device localization that may prevent or hinder unauthorized extension of the signal transmission of wireless devices. More particularly, disclosed systems, devices and methods may provide faster and more efficient trilateration to determine the location of a wireless devices, such as key fob, to an object such as a vehicle.

BRIEF DESCRIPTION OF THE DRAWINGS

The figures and descriptions provided herein may have been simplified to illustrate aspects that are relevant for a clear understanding of the disclosed devices, methods and systems, while eliminating, for the purpose of clarity, other aspects that may be found in typical devices, methods and systems. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

DETAILED DESCRIPTION

Embodiments of a device localization system and method are disclosed. The device localization system and method are particularly applicable to locating a key fob in a keyless system. For example, the keyless system may be implemented in a motor vehicle to activate the ignition, or unlock doors. In such systems the key fob must be within a threshold distance of the vehicle. Disclosed embodiments can detect when the device is within the threshold distance of the vehicle or object and identify its location in 3-D space. The technology may also be applied to unlocking or activating other objects or systems. Disclosed embodiments may be described with respect to vehicles for simplicity but can be applied to other such objects that have electronic features that can be activated by wireless device.

The distance to a wireless device, for example from a vehicle, is determined, for example, using a plurality of sensors. The location of the wireless device is determined or a zone in which it may exist is identified by trilateration based on the determined distances. Trilateration problems can be understood as a minimization problems. To trilaterate a position, a plurality of anchors with known locations is provided. Anchors may be for example, Ultra-wide band (UWB) transmitters. A distance is measured from each of the anchors to the wireless device. The traditional trilateration process involves using least mean squares to minimize the error between a potential position and the anchor ranging results. The traditional method may perform poorly when the inputs contain errors, and therefore, may yield inaccurate results when converging to local minimums.

In embodiments of the localization system a differential evolution (DE) algorithm is used. DE is optimized to perform at a faster pace. Traditional DE works by generating a population of possible minimal solutions and evaluating them by using the fitness of results as a traversal of the error function. This would imply that every time a new ranging result was acquired a new solution population would have to be generated and the error function re-traversed. Disclosed embodiments optimize DE by updating the population of locations, instead of generating new ones and discarding them after each trilateration, as will be described in more detail below.

Figure 1:
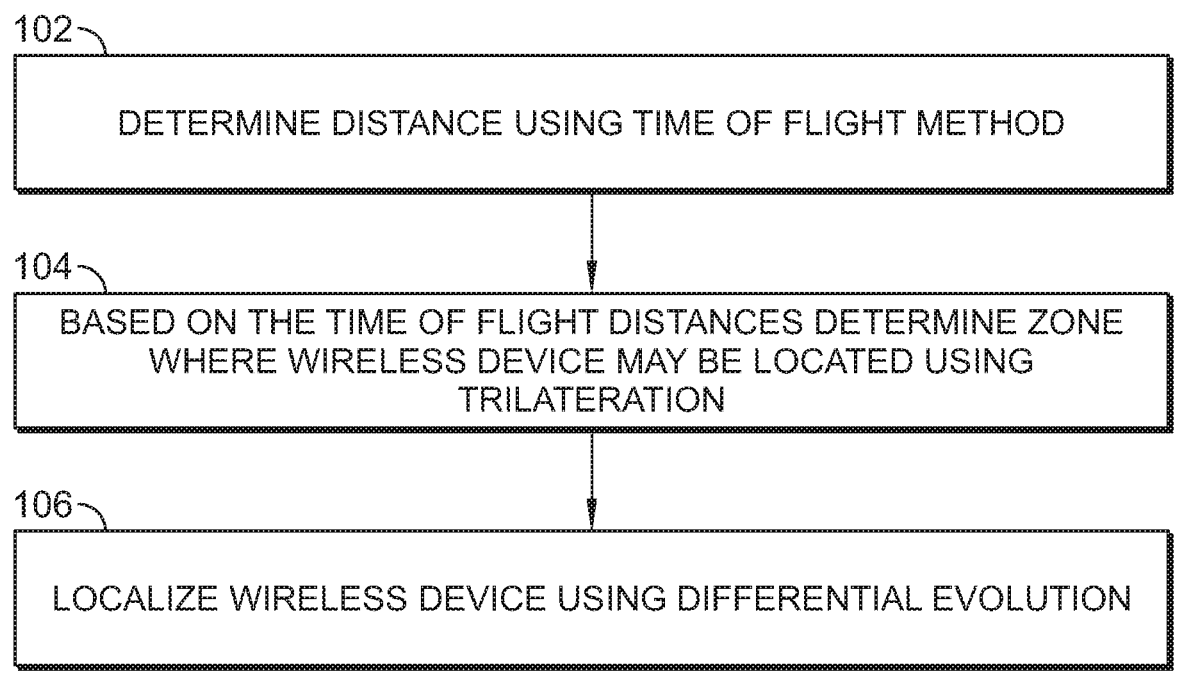
FIG. 1 is a flow chart summarizing an illustrative method of localizing a wireless device.

FIG. 1 is a flow chart summarizing an illustrative method of localizing a wireless device. In step 102 distances between the wireless device and a plurality of anchors are determined. Based on the time of flight distances obtained in step 102, a zone where the wireless device may be located is determined using trilateration in step 104. In step 106 the wireless device is localized using differential evolution.

A plurality of anchors may be located to minimize the size of the region of interest, wherein the region of interest may be the solution space where the ground truth with high probability resides there. In an illustrative embodiment, anchors are located on the interior and exterior of the vehicle. Signals from interior sensors will be weaker than those from exterior sensors because the signals will have to penetrate the boundary, such as a vehicle body, when the wireless device is in an exterior location. Signals from interior sensors will be stronger than those from exterior sensors when the wireless device is in an interior location.

Typically, for a vehicle and key fob system, the key fob will be exterior of the vehicle. The different signal strengths for anchors located exterior and interior of the vehicle may be compensated for in the disclosed methods, systems and devices, If the vehicle has a plurality of anchors, one or more or two or more of the plurality of anchors may be located on the exterior of the vehicle and one or more or two or more of the plurality of anchors may be located on the interior of the vehicle. In further embodiments anchors may be located either on the exterior of the vehicle or within it. In an illustrative embodiment two anchors are located on the same side of the vehicle. For example, both on the passenger side or both on the driver's side. The side having two anchors can also be the front or rear of the vehicle. The phrase "located on" as used herein means located anywhere on the exterior or interior of the vehicle. Specific interior or exterior locations will be specified as such. A high level localization process is performed to compute a set of features. By "high level" it meant that the area is generally sufficient to encompass the optimum solution. Based on the computed set of features, it is determined whether the query point resides inside or outside the vehicle. A region of interest is optimized and the optimum solution for the localization problem is found.

The term "vehicle" is used broadly herein and includes, for example, automobiles, trucks, boats, specialized vehicles: such as those used in construction, boats, motorcycles and any other objects that have a keyless entry, unlocking, or activation system. As used herein with respect to motorized vehicles, the interior of the vehicle is any location within the vehicle frame and the exterior vehicle includes the frame and anything outside of the frame.

Figure 2A:
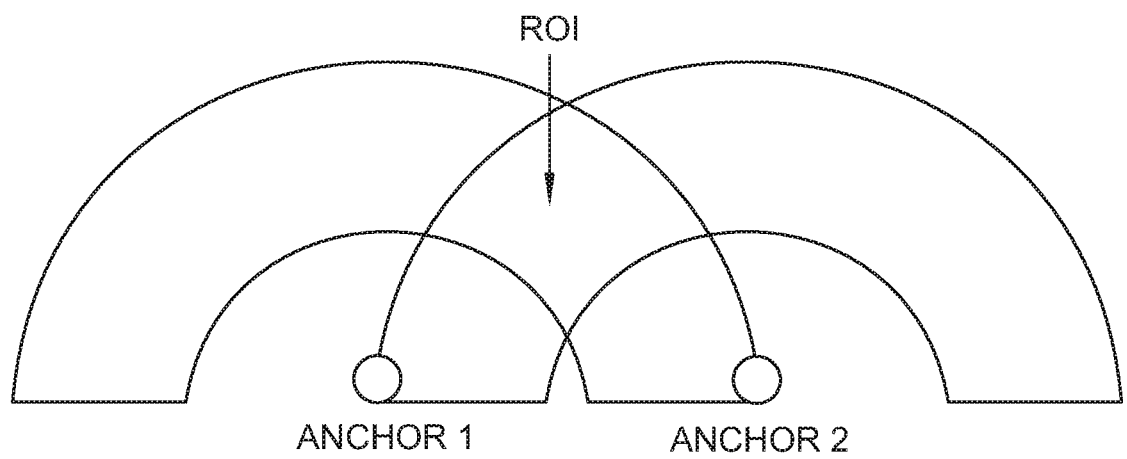
FIGS. 2A, 2B are schematics showing illustrative anchor placements and the resulting regions of interest.
Figure 2B:
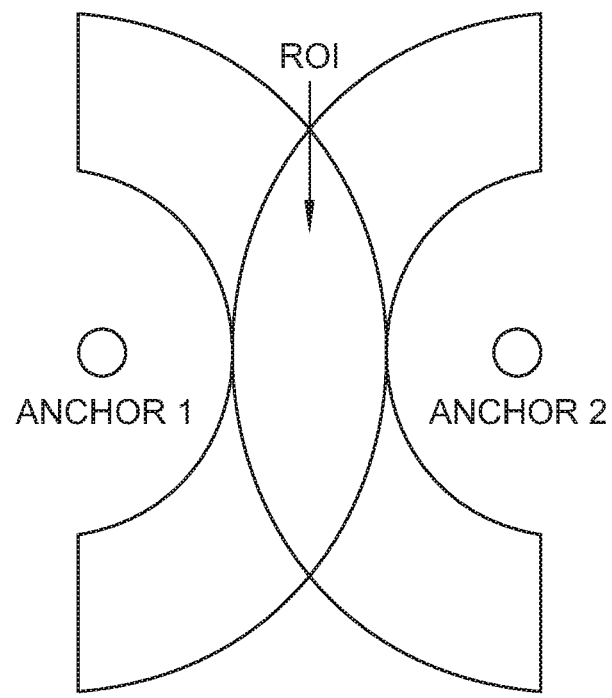

FIGS. 2A, 2B are schematics showing illustrative anchor placements and the resulting regions of interest. FIG. 2A depicts anchors exterior to a vehicle and on the same side of it, resulting in a relatively small region of interest. FIG. 2B shows anchors interior to a vehicle and on different sides of the vehicle resulting in larger region of interest. Accordingly, the anchors' configuration affects the impact of the vehicle's body on the localization. The interior and exterior anchors may have different impact on the localization performance, including possible different wireless channels due to the vehicle's body impacting the performance of anchor ranging. Additionally, for the interior area of the vehicle, the region of interest is surrounded by the vehicle's body. Considering the ranging error, the size of region of interest can be very large for interior area. This problem is less severe for the exterior area when placing anchors on the same side of the vehicle and having a region of interest that is not very large. The size of the region of interest may have a significant impact on the accuracy of the localization, which is something that has previously been ignored. Considering this aspect, disclosed embodiments of a localization solution minimize the size of the region of interest according to the anchors' configurations and positions. The resulting ranging information and regions of interest provide an optimum point as the optimum solution of the localization problem. An illustrative embodiment of an algorithm can be summarized by the following steps:

1) performing a high level localization and computing sets of features using interior anchors and exterior anchors;
2) based on the results of step 1, detecting if the query point resides inside or outside the vehicle; and
3) optimizing the region of interest and finding the optimum solution for the localization problem.

Figure 3:
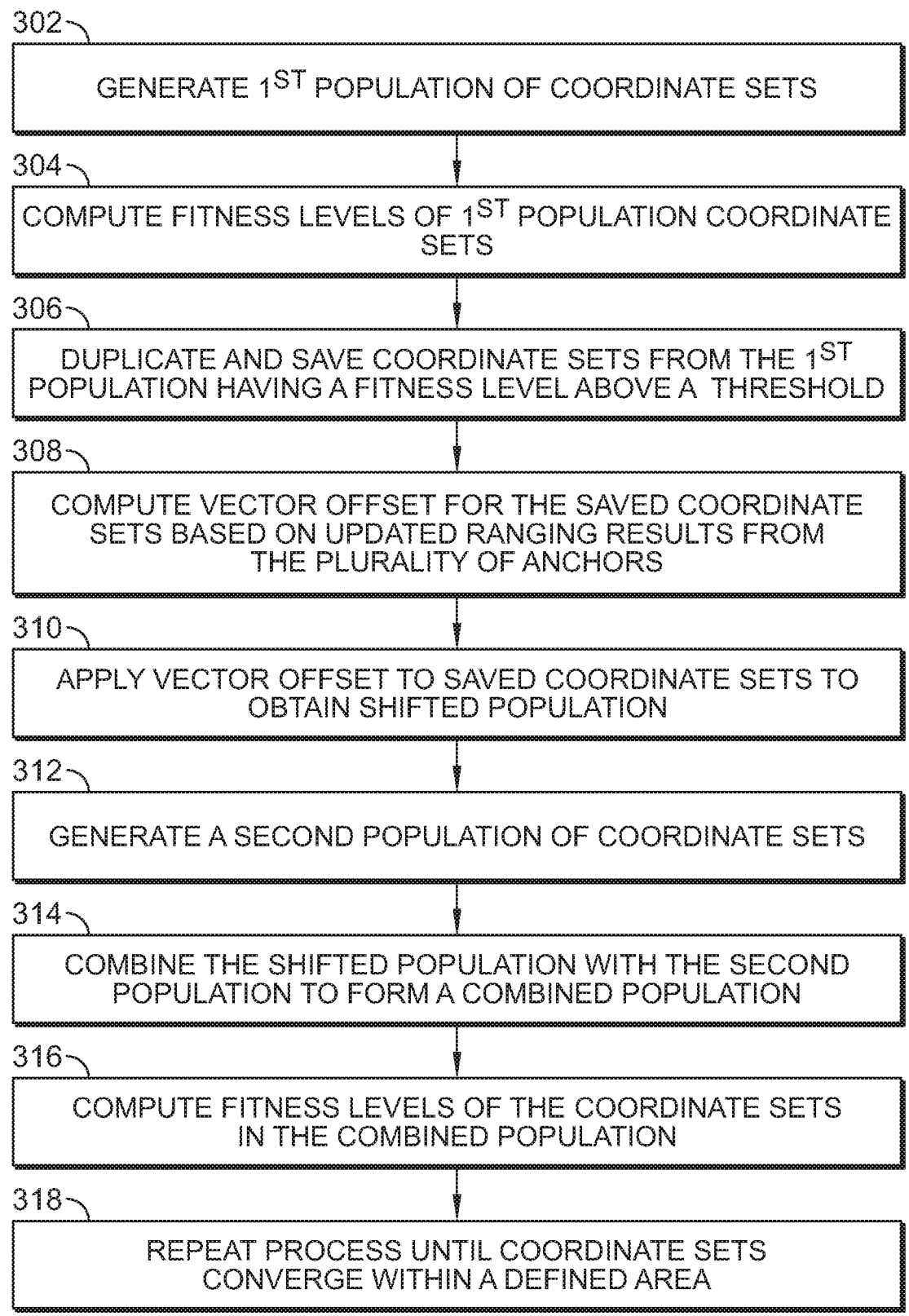
FIG. 3 is a flow chart of an illustrative embodiment of a wireless device localization method incorporating a differential evolution process.

FIG. 3 is a flow chart of an illustrative embodiment of a device localization method. Step 302 of the method includes generating a first population of a plurality of coordinate sets by trilateration, each set describing a possible location in 3-D space of the device. In step 304, the fitness level of the plurality of the coordinate sets is computed by employing a fitness function based on ranging results obtained from a plurality of anchors having known positions. Coordinate sets from the first population having a fitness level above a threshold fitness level are duplicated and saved in step 306, and then used in a subsequently-generated population of coordinate sets. In step 306 a vector offset is computed for the saved coordinate sets, wherein the vector offset is based on updated ranging results from the plurality of anchors. Assuming the device being localized is moving, ranging results will change. In step 310 the vector offset based on historical data is applied to the saved coordinate sets to obtain a shifted population. In step 312 a second population of a plurality of coordinate sets is generated, wherein each set describes a possible location in 3-D space of the device. The shifted population is combined with the second population to form a new, combined population in step 314. The fitness function is then applied to the combined population to compute fitness levels of the coordinate sets in the combined population in step 316. In step 318 the aforementioned steps are repeated until the coordinate sets converge to within a defined area. It is noted, however, that the coordinate sets may not converge. Thus, the process can be repeated until convergence or for a set number of iterations.

The devices, methods and systems disclosed above will now be described in more detail.

In an illustrative trilateration algorithm, the anchors can be defined by A, B, and C. Anchors A, B and C have coordinates $(x_a, y_a, z_a)$, $(x_b, y_b, z_b)$, and $(x_c, y_c, z_c)$, respectively. Anchor selection may play a critical role in trilateration performance. The following two are illustrative approaches to select the anchors used. The first is having a pre-defined set of anchors and always using them. The second is dynamically selecting a subset of all anchors based on real-time conditions and sensor feedback. In the following illustrative method the static set of anchors chosen is seven vehicle interior anchors. The trilateration problem is treated as an optimization problem. Each anchor provides a distance. A point must be identified that satisfies all the distances with the least amount of error. Following are two optimization algorithms. Non-linear least squares is the form of least squares analysis used to fit a set of m observations with a model that is non-linear in n unknown parameters (m>n). In this case, it is specified to the following: an anchor with $A_i$ known location $(x_i, y_i, z_i)$ generates a ranging measurement $R_i$. A location $L(x, y, z)$ with the following minimum should be found:

$$\Sigma_i(R_i-\sqrt{(x_i-x)^2+(y_i-y)^2+(z_i-z)^2}) \text{ in another format:}$$

$$arg\ min_{x,y,z}\Sigma_i(|R_i-\sqrt{(x_i-x)^2+(y_i-y)^2+(z_i-z)^2}|)$$

The trilateration process to generate the first population of coordinate sets relies on the known location of a plurality of anchors. Each of the plurality of anchors generates a signal or senses the environment in a field surrounding it. These fields will occupy 3-D space for most applications of the disclosed system and method. The fields surrounding each anchor may overlap providing potential locations of a device in proximity to the anchors.

Based on the distance of the device to each of the anchors its location can be pinpointed. If the device is moving, its distance from the anchors will change, and thus, additional calculations are required to further pinpoint its location. The distance of the device to each of the anchors may be determined by a time of flight method, or other distance determining method for measuring the distance between a sensor or other anchor, and a device that is compatible with the type of anchor and device. The time of flight method may use light as a carrier, such as infrared light, for example. If the device is moving with respect to the sensor, distance determining methods can be repeated over time to track and locate the device. In a time of flight method, the time difference between sending and receiving a signal from/to an anchor can be measured and multiplied by the speed of light to determine the distance between the anchor and the device.

A fitness function is executed, which when applied to each of the plurality of coordinate sets in the first population, computes the fitness levels of each coordinate set. The fitness function may be based on ranging results obtained from a plurality of anchors having known positions. The ranging results are the distances between the anchors and the device obtained by the distance measuring method.

The coordinate sets from the first population having a fitness level above a threshold fitness level are duplicated and saved. The threshold fitness level may be for example, a distance from the device to the vehicle. In an illustrative embodiment, the threshold fitness level may be in the range of 20 cm to 30 cm. In a further illustrative embodiment the threshold fitness level may be in the range of 10 cm to 40 cm.

A vector offset is computed for the saved coordinate sets based on updated ranging results from the plurality of anchors. The vector offset, which is based on historical data, is applied to the saved coordinate sets to obtain a shifted population. The vector offset is computed based on object tracking history. By following past movement of an object a vector that describes its moving direction and speed is predicted.

A second population of a plurality of coordinate sets is generated, wherein each set describes a possible location in 3-D space of the device. The second population is generated, for example, by a trilateration method based on the same plurality of anchors used to generate the first population of coordinate sets.

The second population of coordinate sets are combined with the shifted population generated by application of the vector offset to form a combined population. The fitness levels of the coordinate sets in the combined population are then computed by employing the fitness function that was initially applied to the plurality of coordinate sets in the first population. Thus, it is not necessary to generate a new solution population and re-traverse the fitness function each time new ranging results are acquired. The differential evolution is optimized by updating the population of locations instead of generating new ones and discarding them after each trilateration. This is done by using the novel observation that the error function stays relatively stable between anchor measurements. After saving a fraction of the population from the previous trilateration process, a vector offset for the saved population is computed based on the new ranging information. This then gives a new and more focused start space in the fitness function. This process may create more effective trilateration results at a faster pace because the new population refines the fitness function minimum.

The aforementioned steps are repeated until the plurality of coordinate sets converge to within a defined area. The defined area may depend or be specific to, for example, on the device and the system of which it is a part. In an illustrative example, the wireless device is a key fob and the object on which it acts is a vehicle door lock. The system can be configured to run until convergence is reached, a threshold number of iterations is performed or a time limit is reached. For example, a time limit of 100 ms is provided within which a result must be reached.

Figure 4:
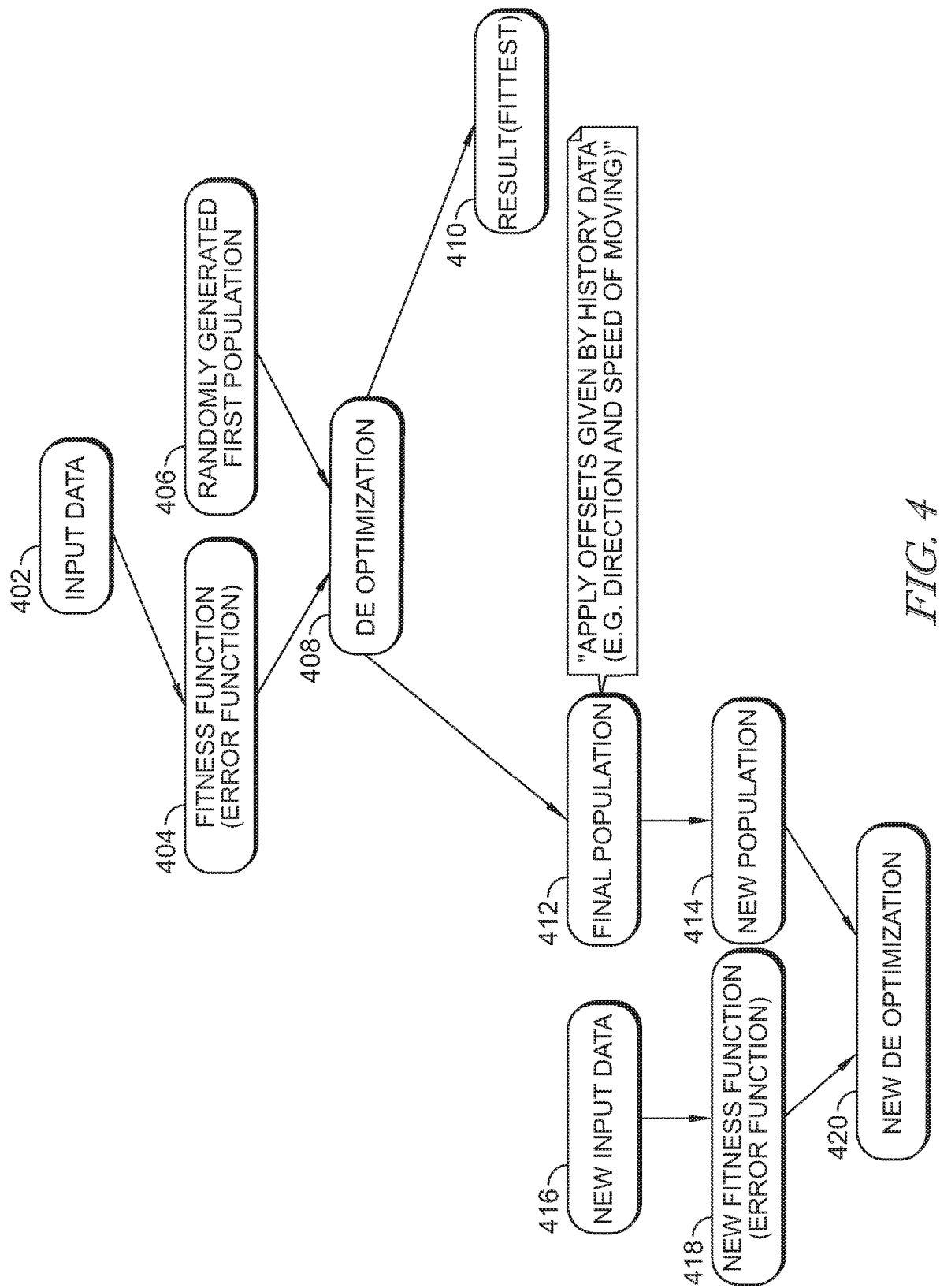
FIG. 4 is a schematic of an illustrative embodiment of an optimization process.

FIG. 4 is a schematic of an illustrative embodiment of an optimization process. In step 402 input data, i.e. ranging data, is obtained. In step 404 an error function is created based on the ranging data from step 402. In step 406 a first population is generated using a trilateration method based on distances between a wireless device and anchors with known locations, wherein the distances may be obtained by a time of flight method. In an illustrative example, the first population may define an area within 5 m to 10 m of a vehicle. In step 408a search space is defined by a differential optimization method. A set of results deemed to be the fittest, i.e. having minimal error, is provided in step 410. An offset derived from by historical data is applied to the "final" or remaining population in step 412. This generates a new population shown in step 414. The offset is based on a transformation in three dimensional space. For example, it may be assumed that the wireless device may be moving at a constant speed. Therefore, the distance the wireless device will move in a given period of time can be determined. The resulting transformation can be applied to the population generated from the previous differential evolution step to generate the new population. Additionally, new input data (new ranging results) are generated in step 416. In step 418 an error function is created based on the ranging data from step 416. Differential optimization is again performed for this new population and error function in step 420. This process can be repeated by separating the fittest results from a new "final population" and again applying an offset to the new "final" population. The process can be repeated any number of time until the optimization desired in achieved or a set number of iterations has been run.

Figure 5:
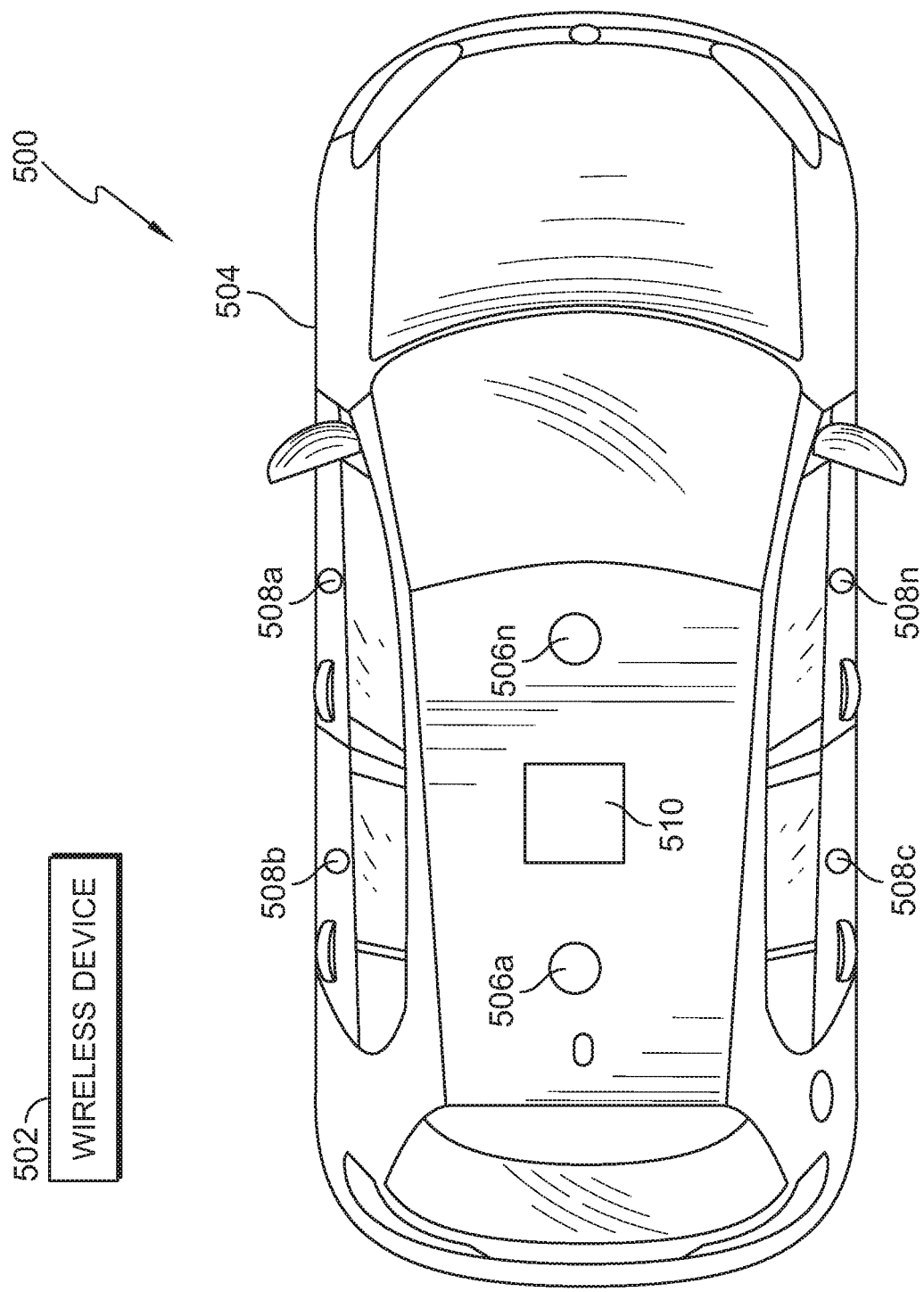
FIG. 5 depicts a wireless device localization system applied to a vehicle have a wireless key fob according to an illustrative embodiment.

FIG. 5 depicts a device localization system 500 according to an illustrative embodiment. Disclosed device localization methods may be applied to wireless device 502, such as a key fob, and a vehicle 504. Wireless device 502 may be used to start the ignition of vehicle 504, lock and unlock doors to vehicle 504 or initiate or cease other actions related to vehicle 504's operation and condition.

Vehicle 504 includes one or more or a plurality of interior anchors $506_{a-n}$, and one or more or a plurality of exterior anchors $508_{a-n}$. A base station 510 is located in vehicle 504 for detecting the location of wireless device 502 with respect to vehicle 504 based on information from one or more or a plurality of interior anchors 506 and exterior anchors 508.

Interior anchors $506_{a-n}$ and exterior anchors $508_{a-n}$ may be for example beacons, or other devices that broadcast light, radio or other electromagnetic signals. Interior anchors $506_{a-n}$ and exterior anchors $508_{a-n}$ may use Bluetooth technology, for example. Interior anchors $506_{a-n}$ and exterior anchors $508_{a-n}$ mark fixed locations that broadcast signals, for example to wireless device 502. Interior anchors $506_{a-n}$ and exterior anchors $508_{a-n}$ may transmit and receive signals to/from wireless device 502.

Base station 510 may include components and circuitry to start and turn off an ignition of vehicle 504, unlock or lock doors of vehicle 504, or initiate or cease other actions related to vehicle 504's operation and condition, in response to signals received from other devices either in or apart from vehicle 504. These signals may be generated, for example, by wireless device 502 being positioned within a defined area relative to vehicle 504, and/or a command received from wireless device 502.

In an illustrative embodiment the distance between wireless device 502 and any of interior anchors 506$_{a-n}$ and exterior anchors 508$_{a-n}$ is determined by a time of flight method. Base station 510 may use information gathered by interior anchors 506$_{a-n}$ and exterior anchors 508$_{a-n}$ to execute a trilateration method to locate an area in which wireless device 502 may be located. For example, distance information from three of interior anchors 506$_{a-n}$ and exterior anchors 508$_{a-n}$ may provide a location of wireless device 502 with respect to vehicle 504. Information from a fourth one of the interior anchors 506$_{a-n}$ or exterior anchors 508$_{a-n}$ may provide the location of wireless device 502 in 3-D space with respect to vehicle 504.

Distance information generated by the time of flight, or other distance-determining method, enable base station 510 to locate wireless device 502 with respect to vehicle 504.

Distance information generated by the time of flight, or other distance-determining method, enables base station 510 to locate wireless device 502 with respect to vehicle 504.

Figure 6:
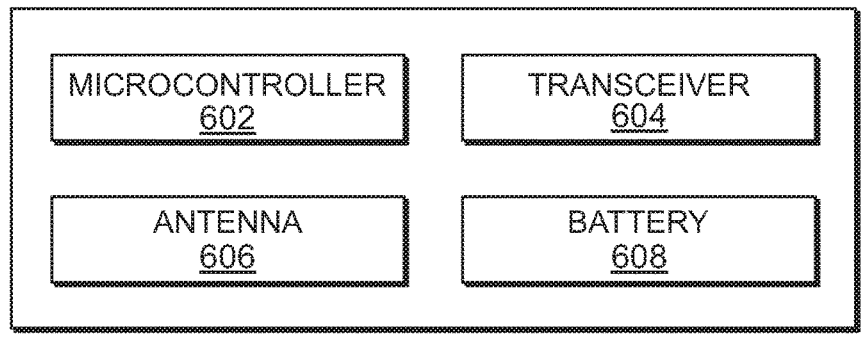
FIG. 6 is a schematic of a device localization system according to an illustrative embodiment.
Figure 6:
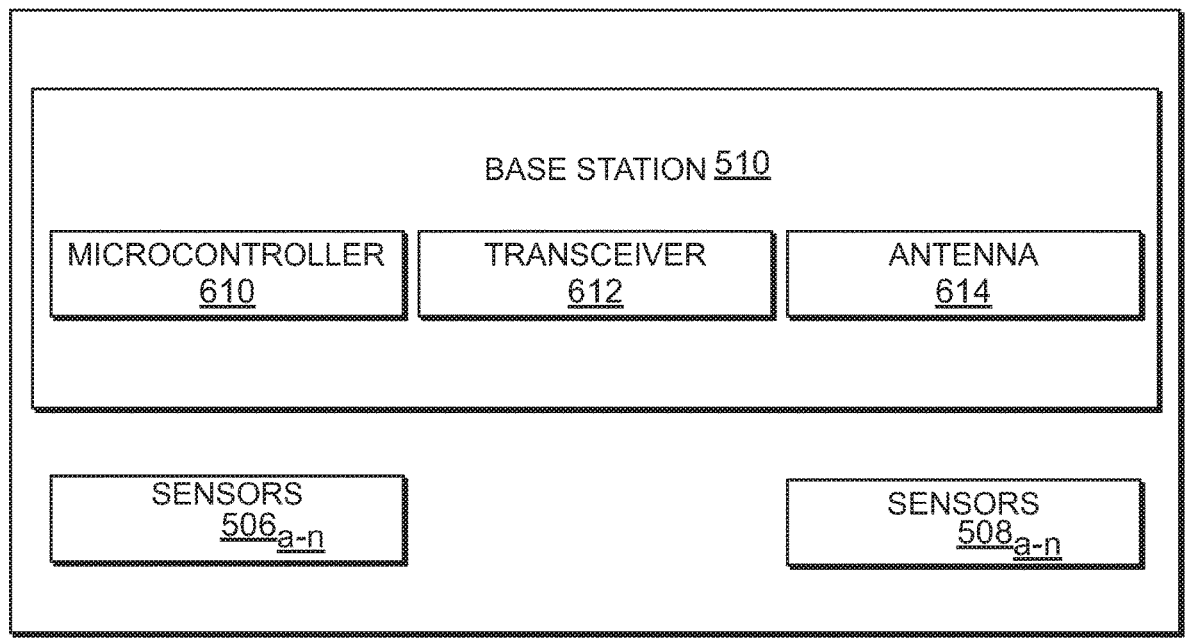

FIG. 6 is a schematic of a device localization system 600 according to an illustrative embodiment. Device localization system 600 includes wireless device 502 and vehicle 504. A controller 602, which may be contained in wireless device 502, is functionally coupled to a transceiver 604 and an antenna 606, which may also be housed in wireless device 502. Transceiver 604 transmits and receives signals to/from base station 510. Base station 510 may be located in vehicle 504, for example. A plurality of sensors 506 may be distributed around and within vehicle 504. Sensors 506 may include transceivers 624 and antennae 626. Sensors 506 may interact only with wireless device 502, or may function in coordination with base station 510. For example, sensors 506 may provide base station 510 with data. Each sensor will provide base station 510 with a distance to wireless device 502. Base station 510 may then implement a trilateration process on the data to more precisely locate wireless device 502. A single sensor distance can indicate that wireless device 502 can be anywhere on a circumference of a circle having a radius of that distance. Combining information from additional sensors can narrow down where in the circle or on a sphere the wireless device resides. Because sensors 506 are fixed in vehicle 504, the positions of wireless device 502 with respect to vehicle 504 can be determined.

In an illustrative embodiment wireless device 502 has a battery 608. Battery 608 may be rechargeable or replaceable, for example. Battery 608 provides power to controller 602, and other components of wireless device 502. If battery 608 is rechargeable, it may be charged wirelessly or by connecting it to a power source.

Battery-saving systems may be employed in wireless device 502 to save or minimize use of battery power. For example, wireless device 502 may be configured to be activated only upon certain conditions, such as motion or proximity to objects or system components.

Transceiver 604 is configured to operate at a frequency or range of frequencies that to enable wireless device 502 t function as described herein.

Base station 510 contains a controller 610 and transceiver 612. An antenna 614 may also be included in base station 510. Base station 510 may be powered, for example, by a vehicle battery, or other power source. It is noted that other base stations may be included in the system. Additionally, various components, such as controllers or antennae may be present as multiples. Controllers 602, 610 may be microcontrollers. Controllers 602, 610 may contain memory 620, and processor 622.

Wireless device 502 and base station 510 may include a switch 616, 618, respectively, or other component to route signals through transmission paths. Illustratively, switches 616, 618 may be RF switches.

To obtain data regarding the distance between wireless device 502 and vehicle 504, wireless device 502 transmits a signal via wireless device transceiver 604, which is received by vehicle transceiver 612, if within its range of detection. Time of flight distance measurements can then be obtained between wireless device 502 and vehicle 504. Wireless device 502 signals may be transmitted continually, periodically, or for limited duration time periods that are initiated and ended by trigger actions, for example movement.

Disclosed embodiments provide systems, devices and methods for wireless device localization that may prevent or hinder unauthorized extension of the signal transmission of wireless devices. Traditional keyless entry systems use signal strength to determine when a key fob is close enough to a vehicle to activate the locks or other electronic components. Amplification of the signal strength can be accomplished using readily available electronic devices so the key fob holder need not be close to the vehicle to activate electronic functions. Thus, a user of an amplification device can accomplish the actions of the key fob without the key fob holder being aware. Embodiments of the disclosed method, system and device use time of flight to determine the location of the key fob with respect to the vehicle, and thus, amplification of an anchor signal will not change the range within which the key fob must be to activate the electronic features it is designed to trigger. Additionally, the trilateration with differential evolution, which may render the data processing more accurate and efficient, further enhances these protections. The disclosed method and system may provide a more accurate localization system that is not as computationally heavy and time consuming as traditional methods.

The method, devices and systems are novel because differential evolution computing is used to find global minimums instead of local minimums. Computation time may be saved by preserving populations in the continuous trilateration process described herein. With newer hardware that provides better ranging results, the optimization process became the bottleneck. Thus, the disclosed technology alleviated the bottleneck for more efficient processing. By deducing that the fitness function can be very stable between anchor measurements, which is not obvious, it became understood that the solution population must also stay relatively stable. Furthermore, by applying an offset to the input population, the offset population will land close to the function minimum.

Various illustrative embodiments have been described, each having a different combination of elements. The invention is not limited to the specific embodiments disclosed, and may include different combinations of the elements disclosed, omission of some elements or the replacement of elements by the equivalents of such structures. Further, when a particular feature, structure, or characteristic is described in connection with an embodiment, it is believed to be within the knowledge of one skilled in the art to affect such feature, structure, or characteristic in connection with other embodiments whether or not explicitly indicated.

While the invention has been described by illustrative embodiments, additional advantages and modifications will occur to those skilled in the art. Therefore, the invention in its broader aspects is not limited to specific details shown and described herein. Modifications, for example, to computer architecture, order of method steps and types of electronic components, may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A device localization method comprising:
   (a) obtaining by a plurality of sensor distances between a wireless device and a vehicle;
   (b) generating by trilateration of the distances a first population of a plurality of coordinate sets, each set describing a possible location in 3-D space of the device;
   (c) computing fitness levels of each of the plurality of the coordinate sets by employing a fitness function based on ranging results obtained from a plurality of anchors having known positions;
   (d) saving coordinates sets from the first population having a fitness level above a threshold fitness level;
   (e) computing a vector offset to the saved coordinate sets based on updated ranging results from the plurality of anchors;
   (f) applying the vector offset based on historical data to the saved coordinate sets to obtain a shifted population;
   (g) generating a second population of a plurality of coordinate sets, each set describing a possible location in 3-D space of the device;
   (h) combining the shifted population with the second population to form a combined population; and
   (i) computing fitness levels of the coordinate sets in the combined population by employing the fitness function.

2. The device localization method of claim 1 further comprising:
   saving the coordinate sets from the combined population having a fitness level above the threshold fitness level;
   repeating operations (e) through (i) as they pertain to the combined population and to further updated ranging results from the plurality of anchors of and further repeating operations (e) through (i) on each additional combined population formed and on further updated ranging results from the plurality of anchors until the coordinate sets converge to within a defined area or a threshold number of iterations has been reached.

3. The device localization method 1 further comprising:
   locating the plurality of anchors to minimize region of interest size.

4. The device localization method of claim 1 wherein the device is a wireless key and the anchors are located on a vehicle.

5. The device localization method of claim 3 further comprising:
   locating the at least two of the plurality of anchors on an exterior portion of the vehicle.

6. The device localization method of claim 5 wherein at least two of the plurality of anchors are located on the same side of the vehicle as one another.

7. The device localization method of claim 5 wherein one or more of the plurality of anchors are located on an exterior portion of the vehicles and one or more of the plurality of anchors are located in the interior of the vehicle.

8. A system for localization of a wireless device comprising:
   one or more processors operatively coupled to one or more non-transitory storage devices on which is stored executable computer code, which when executed by the one or more processors causes the system to perform the method of:
   (a) obtaining by a plurality of sensors distances between a wireless device and a vehicle;
   (b) generating by trilateration of the distances a first population of a plurality of coordinate sets, each set describing a possible location in 3-D space of the device;
   (c) computing fitness levels of each of the plurality of the coordinate sets by employing a fitness function based on ranging results obtained from a plurality of anchors having known positions;
   (d) saving coordinates sets from the first population having a fitness level above a threshold fitness level;
   (e) computing a vector offset to the saved coordinate sets based on updated ranging results from the plurality of anchors;
   (f) applying the vector offset based on historical data to the saved coordinate sets to obtain a shifted population;
   (g) generating a second population of a plurality of coordinate sets, each set describing a possible location in 3-D space of the device;
   (h) combining the shifted population with the second population to form a combined population; and
   (i) computing fitness levels of the coordinate sets in the combined population by employing the fitness function.

9. The system for localization of a wireless device of claim 8 further comprising:
   saving the coordinate sets from the combined population having a fitness level above the threshold fitness level;
   repeating method operations (e) through (i) as they pertain to the combined population and to further updated ranging results from the plurality of anchors and further repeating operations (e) through (i) on each additional combined population formed and on further updated ranging results from the plurality of anchors until the coordinate sets converge to within a defined area or a threshold number of iterations has been reached.

10. The system for localization of a wireless device of claim 8 further comprising:
    locating the plurality of anchors to minimize region of interest size.

11. The system for localization of a wireless device of claim 8 wherein the device is a wireless key and the anchors are located on a vehicle.

12. The system for localization of a wireless device of claim 11 further comprising:
    locating the at least two of the plurality of anchors on an exterior portion of the vehicle.

13. The system for localization of a wireless device of claim 11 wherein at least two of the plurality of anchors are located on the same side of the vehicle as one another.

14. The system for localization of a wireless device of claim 11 wherein one or more of the plurality of anchors are located on an exterior portion of the vehicles and one or more of the plurality of anchors are located in the interior of the vehicle.

* * * * *